US009837816B2

(12) United States Patent
Miyamura et al.

(10) Patent No.: US 9,837,816 B2
(45) Date of Patent: Dec. 5, 2017

(54) SEMICONDUCTOR DEVICE, POWER SUPPLY CONTROL METHOD OF SEMICONDUCTOR DEVICE, AND SENSOR NODE

(71) Applicant: NEC CORPORATION, Tokyo (JP)

(72) Inventors: Makoto Miyamura, Tokyo (JP);
Noboru Sakimura, Tokyo (JP);
Ryusuke Nebashi, Tokyo (JP);
Yukihide Tsuji, Tokyo (JP); Tadahiko Sugibayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 520 days.

(21) Appl. No.: 14/389,311

(22) PCT Filed: Mar. 28, 2013

(86) PCT No.: PCT/JP2013/059354
§ 371 (c)(1),
(2) Date: Sep. 29, 2014

(87) PCT Pub. No.: WO2013/147070
PCT Pub. Date: Oct. 3, 2013

(65) Prior Publication Data
US 2015/0048680 A1 Feb. 19, 2015

(30) Foreign Application Priority Data

Mar. 29, 2012 (JP) ................. 2012-077960

(51) Int. Cl.
*H02J 1/08* (2006.01)
*H02J 1/10* (2006.01)

(52) U.S. Cl.
CPC ............ *H02J 1/08* (2013.01); *H02J 1/102* (2013.01); *Y10T 307/406* (2015.04)

(58) Field of Classification Search
USPC ............................................ 307/31; 327/536
See application file for complete search history.

(56) References Cited

U.S. PATENT DOCUMENTS 7,760,675 B2    7/2010  Sakai et al.
7,969,121 B2    6/2011  Smith et al.
(Continued)

FOREIGN PATENT DOCUMENTS

JP    H03103028 A    4/1991
JP    09-37461       2/1997
(Continued)

OTHER PUBLICATIONS

International Search Report PCT/JP2013/059354 dated May 14, 2013.
(Continued)

*Primary Examiner* — Rexford Barnie
*Assistant Examiner* — Xuan Ly
(74) *Attorney, Agent, or Firm* — Young & Thompson

(57) ABSTRACT

A semiconductor device includes a current control unit whose conductance is variable and a control unit configured to control the conductance of the current control unit. The current control unit is connected to a direct current power source in parallel with a load for the direct current power source, through a capacitor. The control unit sets the current control unit to a first conductance when the direct current power source and the load are not in a conduction state, and sets the current control unit to a second conductance larger than the first conductance when the direct current power source and the load are in the conduction state.

20 Claims, 12 Drawing Sheets

(56) References Cited

U.S. PATENT DOCUMENTS

2007/0200697 A1 8/2007 Sakai et al.
2008/0129219 A1 6/2008 Smith et al.

FOREIGN PATENT DOCUMENTS

| JP | H0937461 | * | 2/1997 |
| JP | 2007-079669 | | 3/2007 |
| JP | 2007174780 A | | 7/2007 |
| JP | 2007-243933 | | 9/2007 |
| JP | 2007-282316 | | 10/2007 |
| JP | 2007282316 | * | 10/2007 |
| JP | 2008-529177 | | 7/2008 |
| JP | 2009-195037 | | 8/2009 |
| JP | 2009195037 | * | 8/2009 |

OTHER PUBLICATIONS

Japanese Office Action dated Apr. 4, 2017; Publication No. 2014-508050.

* cited by examiner

SEMICONDUCTOR DEVICE, POWER SUPPLY CONTROL METHOD OF SEMICONDUCTOR DEVICE, AND SENSOR NODE

CROSS-REFERENCE TO RELATED APPLICATIONS

The present invention is based upon and claims the benefit of the priority of Japanese Patent Application No. 2012-077960 (filed on Mar. 29, 2012), the disclosure of which is incorporated herein in its entirety by reference.

TECHNICAL FIELD

The present invention relates to a semiconductor device, a power supply control method of the semiconductor device, and a sensor node. More specifically, the invention relates to a semiconductor device that receives power supply from a direct current power source, a power supply control method of the semiconductor device, and a sensor node.

BACKGROUND

In recent years, a sensor node including in its inside a temperature sensor, a moisture sensor, or a human sensor configured to detect the presence of a human is often installed in a house or an office. Such a sensor node is essential for achieving a more comfortable life environment. The sensor nodes distributed and disposed in a house or the like can transmit and receive data with a host device for the sensor nodes by wireless communication. The host device performs unified management of environmental information on the house or the like, and uses the environmental information for control of lighting, air conditioning, and the like. Alternatively, it is also possible to construct a security system when the sensor node including the human sensor is used.

Each sensor node is not necessarily disposed in a location in the vicinity of an electrical outlet. Thus, a direct current power source such as a battery or a button battery is often used as a power source. Further, since the sensor node is installed in order to obtain the environmental information on the house or the like, the sensor node repeats an operation of transmitting data on temperature, moisture, or the like to the host device at a constant cycle. Further, since the sensor node is not disposed for a purpose such as interior decoration, and is often installed in an out-of-sight place. For that reason, a large amount of cost (maintenance cost) is needed to replace the battery of the sensor node. Thus, a sensor node that does need battery replacement as little as possible is demanded. That is, a sensor node, in which the service life of the battery is increased, is demanded. More specifically, the service life of the battery in units of year is desired in order to reduce the maintenance cost for charging or replacement of the battery.

Then, various technologies for reducing power consumption of the sensor node are present. To take an example, in a period except when the sensor mode is operated to obtain and transmit the environmental information, transition to a sleep mode is made. In the sleep mode, only a minimum function is activated, and the other functions are stopped.

Patent Literatures (PTLs) 1 and 2 each discloses a technology for suppressing a peak of a current to be consumed by a wireless communication device by operating modules included in the wireless communication device in a predetermined order.

Patent Literature 3 discloses a power supply device in which a battery and a capacitor are disposed in parallel to suppress a peak of a current to be supplied to a load.

[PTL 1]
JP Patent Kokai Publication No. JP2007-243933A
[PTL 2]
JP Patent Kokai Publication No. JP2007-079669A
[PTL 3]
JP Patent Kohyo Publication No. JP2008-529177A

SUMMARY

Each disclosure of the prior art literatures is incorporated herein by reference. The following is an analysis given by the inventors of the present invention.

As described above, the sensor node often repeats transitioning to the sleep mode and returning to a normal operation mode (active mode) in order to reduce power consumption. However, when the sensor node returns to the active mode from the sleep mode, a large current is needed for activating (starting) each module. Consequently, when the sensor node returns to the active mode from the sleep mode, an inrush current (peak current) larger than a stationary current is generated. When the sensor node frequently repeats transitioning to the sleep mode and returning to the active mode so as to reduce power consumption of the sensor node, an opportunity of generation of the peak current increases.

The maximum value of an output current is prescribed in detail according to the type of the battery (direct current power source). To take an example, when the battery is a lithium primary battery in the shape of a button, a maximum current value is on the order of several dozen mA. The battery must be used within a range in conformity with this maximum current value. Further, even if the maximum current value has not been reached, the discharge capacity of the battery may be reduced when the maximum value of the output current is large.

Further, study of the inventors has revealed that, when the peak current is frequently generated, the service life of the battery is adversely affected. More specifically, the study of the inventors has revealed that, when the lithium primary battery is used as the direct current power source, a dendrite crystal is deposited on the electrode of the lithium primary battery to remarkably reduce the service life of the lithium primary battery. That is, when an excessive peak current flows through the direct current power source, the direct current power source deteriorates. As described above, in a semiconductor device using the direct current power source, there is a problem that, when power consumption of the semiconductor device is to be reduced, the direct current power source deteriorates.

According to a first aspect of the present invention, there is provided a semiconductor device, includes: a current control unit whose conductance is variable; and a control unit configured to control the conductance of the current control unit. The current control unit is connected to a direct current power source in parallel with a load for the direct current power source, through a capacitor. The control unit sets the current control unit to a first conductance when the direct current power source and the load are not in a conduction state. The control unit sets the current control unit to a second conductance larger than the first conductance when the direct current power source and the load are in the conduction state.

According to a second aspect of the present invention, there is provided a power supply control method of a semiconductor device including a current control unit connected to a direct current power source in parallel with a load for the direct current source, through a capacitor, a conductance of the current control unit being variable, the power supply control method including: setting the current control unit to a first conductance, thereby starting charging of the capacitor; and setting the current control unit to a second conductance when the direct current source and the load are conducted, thereby starting discharging of the capacitor.

According to a second aspect of the present invention, there is provided a power supply control method of a semiconductor device including a current control unit connected to a direct current power source in parallel with a load for the direct current source, through a capacitor, a conductance of the current control unit being variable, the power supply control method including the steps of: setting the current control unit to the first conductance, thereby starting charging of the capacitor; and setting the current control unit to the second conductance when the direct current source and the load are conducted, thereby starting discharging of the capacitor.

According to a third aspect of the present invention, there is a provided a sensor node including: the semiconductor device according to the first aspect mentioned above; a direct current power source; a voltage converter configured to convert a voltage output by the direct current power source and supply the converted voltage to the semiconductor device; and a sensor module including a sensor configured to detect an external environmental condition.

According to each aspect of the present invention, there are provided the semiconductor device, the power supply control method of the semiconductor device, and the sensor node that contribute to suppression of deterioration of the direct current power source while reducing power consumption.

BRIEF DESCRIPTION OF THE DRAWINGS

FIG. 7 is a diagram showing an example of an internal configuration of a semiconductor device 1a.

PREFERRED MODES

Figure 1:
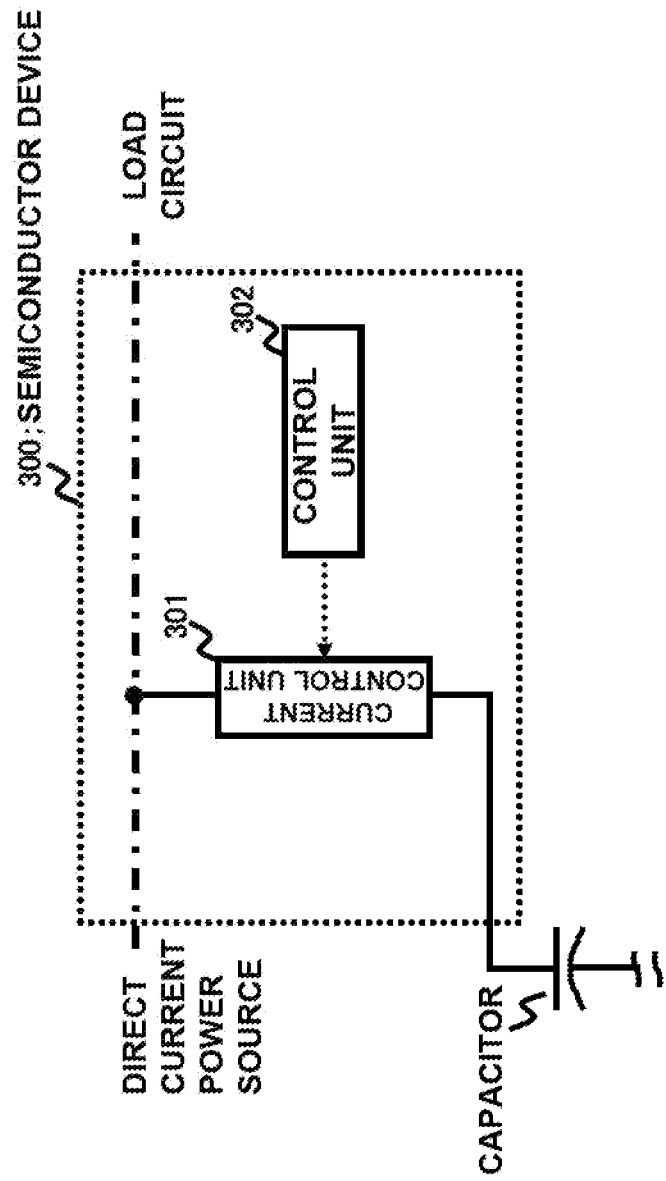
FIG. 1 is a diagram for explaining an overview of an exemplary embodiment.

First, an overview of an exemplary embodiment will be described using FIG. 1. A reference sign in the drawing appended to this overview is given to each element for convenience, as an example for helping understanding, and the description of this overview does not intend to impose any limitation.

In order to reduce power consumption of a semiconductor device, a circuit (load as seen from a direct current power source) for implementing a function of the semiconductor device needs to be inactivated and transition to a sleep mode needs to be made. However, when transition from the sleep mode to an active mode is repeated, inactivation and activation of the circuit that serves as the load is repeated. An opportunity of generation of a peak current in the direct current power source therefore increases. The direct current power source thereby deteriorates. A semiconductor device is therefore desired in which deterioration of the direct current power source is suppressed while reducing power consumption of the semiconductor device.

Then, a semiconductor device 300 shown in FIG. 1 is provided, as an example. The semiconductor device 300 includes a current control unit 301 whose conductance is variable and a control unit 302 configured to control the conductance of the current control unit 301. The current control unit 301 is connected to a direct current power source in parallel with a load for the direct current power source, through a capacitor. When the direct current power source and the load are not in a conduction state, the control unit 302 sets the current control unit 301 to a first conductance. When the direct current power source and the load are in the conduction state, the control unit 302 sets the current control unit 301 to a second conductance larger than the first conductance.

The semiconductor device 300 operates by the direct current power source. For that reason, the control unit 302 included in the semiconductor device 300 cannot control a current supply capability (generation of a peak current) of the direct current power source. Then, the capacitor is provided as a virtual power source that can be controlled by the control unit 302. Current supply of the direct current source is assisted by freely controlling charging and discharging of this capacitor by the control unit 302. More specifically, the control unit 302 grasps a timing of conduction between the direct current power source and the load. Such a timing is also a timing of generation of the peak current. Then, when the control unit 302 determines that the peak current is to be generated in the direct current power source by conduction between the direct current power source and the load, the control unit 302 discharges the capacitor that has been charged in advance to assist the current supply of the direct current power source, thereby suppressing generation of the peak current. The capacitor is charged in a state where the direct current power source and the load are not in the conduction state. The semiconductor device 300 controls charging and discharging of the capacitor according to the characteristic of the load seen from the direct current power source, thereby reducing the peak current and suppressing deterioration of the direct current power source.

The semiconductor device 300 sets the current control unit 301 to the first conductance in the state where the direct current power source and the load are not in the conduction state (when charging the capacitor). On the other hand, when the direct current power source and the load are conducted, the semiconductor device 300 sets the current control unit 301 to the second conductance. The first conductance is designed to be a small value not to increase the peak current of the direct current power source when the capacitor is charged. On the other hand, the second conductance is designed to be a large value so as to increase the discharging capability of the capacitor when the capacitor is discharged. The direct current power source and the load are conducted in a state where the discharging capability of the capacitor is enhanced in this manner. As a result, most of a transient current necessary for activating the circuit that serves as the load is supplied by the capacitor that has been charged. The peak current is thereby reduced, so that deterioration of the direct current power source can be suppressed.

As described above, by switching the conductance of the current control unit 301, a time constant is switched between when charging the capacitor and when discharging the capacitor. As a result, the semiconductor device 300 can be provided in which by transitioning to the sleep mode, deterioration of the direct current power source is suppressed while reducing power consumption. The semiconductor device 300 is suited for use as a CPU (Central Processing Unit) including a functional module in its inside, a direct current power source control apparatus, or the like.

Further, the following modes are possible.

[First Mode]
See the semiconductor device according to the first aspect described above.

[Second Mode]
Preferably, the second conductance is larger than a conductance of the direct current power source.

[Third Mode]
Preferably, the control unit changes control over the current control unit according to an electrical characteristic of the load.

[Fourth Mode]
Preferably, the current control unit is configured by including a first MOS transistor and a second MOS transistor having a diving capability higher than the first MOS transistor, and the control unit sets the first conductance by turning on the first MOS transistor, and sets the second conductance by turning on the second MOS transistor.

[Fifth Mode]
Preferably, the current control unit is configured by including an MOS transistor or a bipolar transistor, and the control unit switches the first conductance and the second conductance by varying a gate voltage of the MOS transistor or a base current of the bipolar transistor.

[Sixth Mode]
Preferably, the load is constituted from a plurality of power supply regions, a switch is provided for each of the plurality of power supply regions, and the control unit turns on the switch when the direct current power source and the load are in the conduction state.

[Seventh Mode]
Preferably, the semiconductor device includes: a plurality of the current control units respectively associated with a plurality of the capacitors disposed in parallel between the direct current power source and the load.

[Eighth Mode]
Preferably, the control unit changes a period during which the direct current power source and the load are in the conduction state, according to a capacitive load of the load.

[Ninth Mode]
Preferably, the control unit changes the period during ich the direct current power source and the load are in the conduction state, based on the number of the power supply regions of the plurality of power supply regions to be activated.

[Tenth Mode]
Preferably, the control unit determines the number of the capacitors to be charged, according to the electrical characteristic of the load.

[Eleventh Mode]
Preferably, the first MOS transistor and the control unit are formed on a same semiconductor substrate.

[Twelfth Mode]
Preferably, at least one of the capacitor and the second MOS transistor is formed outside the semiconductor substrate.

[Thirteenth Mode]
Preferably, the semiconductor device includes: at least one of a terminal configured to connect the capacitor and a terminal configured to control the second MOS transistor.

[Fourteenth Mode]
Preferably, the semiconductor device includes a voltage converter configured to convert a first voltage supplied, from the direct current power source to a second voltage, and the load receives one of the first voltage and the second voltage.

[Fifteenth Mode]
Preferably, the semiconductor device includes a first comparator configured to output a result of comparison between the first voltage and a first reference voltage, and when the first voltage becomes lower than the first reference voltage, the control unit brings the direct current power source and the load into the conduction state, based on a result of an output of the first comparator.

[Sixteenth Mode]
Preferably, the semiconductor device includes: a rectangular wave generation unit configured to generate from the first voltage rectangular wave with a predetermined cycle and supplies to the load a third voltage obtained by smoothing the rectangular wave; a second comparator configured to output a result of comparison between the third voltage and a second reference voltage; and a rectangular wave control unit configured to change the cycle of the rectangular wave, based on a result of an output of the second comparator.

[Seventeenth Mode]
Preferably, the rectangular wave generation unit is configured by including a high-side switch connected to a first power supply line configured to supply the first voltage and a low-side switch with one end thereof connected to a ground potential, and the rectangular wave control unit complementarily switches the high-side switch and the low-side switch, thereby changing the cycle of the rectangular wave.

[Eighteenth Mode]
See the power supply control method of a semiconductor device according to the second aspect described above.

[Nineteenth Mode]
Preferably, the power supply control method of the semiconductor device further includes: changing a period for charging the capacitor according to an electrical characteristic of the load.

[Twentieth Mode]
Preferably, the power supply control method of the semiconductor device includes: when the load includes a plurality of power supply regions, changing the period for charging the capacitor based on the number of the power supply regions to be activated.

[Twenty-First Mode]
Preferably, the semiconductor device includes: a plurality of the capacitors; and a plurality of the current control units respectively associated with a plurality of the capacitors. Then, the power supply control method includes determining the number of the capacitors of the plurality of the capacitors to be charged according to the electrical characteristic of the load.

[Twenty-Second Mode]

See the sensor node according to the third aspect described above.

Specific exemplary embodiments will be explained below in further detail with reference to the drawings.

First Exemplary Embodiment

A first exemplary embodiment will be explained in more detail using the drawings.

Figure 2:
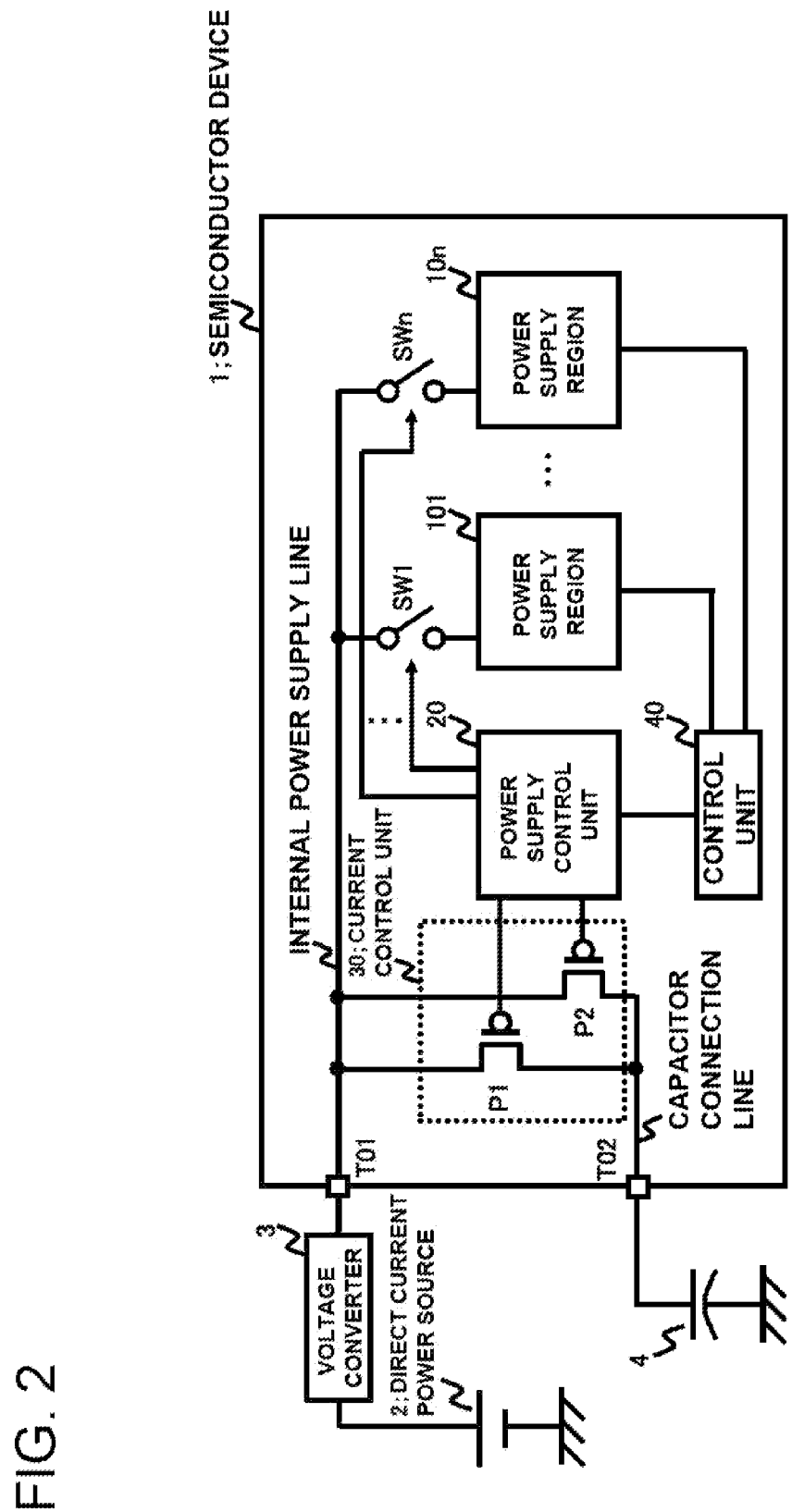
FIG. 2 is a diagram showing an example of an internal configuration of a semiconductor device 1 according to a first exemplary embodiment.

FIG. 2 is a diagram showing an example of an internal configuration of a semiconductor device 1 according to this exemplary embodiment. Referring to FIG. 2, modules related to the semiconductor device 1 according to this exemplary embodiment will be described, for simplification.

The semiconductor device 1 receives power supply from an outside through an input power supply terminal T01. A direct current power source 2 supplies power to the semiconductor device 1 through a voltage converter 3. The semiconductor device 1 further includes an external smoothing capacitor connection terminal T02, and is connected to a capacitor 4 through the external smoothing capacitor connection terminal T02. The semiconductor device 1 includes a plurality of power supply regions (power domains) in its inside.

Each power supply region is a region configured to operate based on power to be supplied by a switch associated with the power supply region. That is, when a certain power supply region is activated, the power is supplied to the power supply region by short-circuiting the switch associated with the power supply region. On the other hand, when the power supply region is inactivated, the power to be supplied to the power supply region is interrupted by opening the switch associated with the power supply region. By appropriately inactivating the power supply region, transition to a sleep mode is made. Then, the semiconductor device 1 activates the power supply region that has been inactivated if needed, thereby returning to an active mode.

In this exemplary embodiment, explanation will be given about reduction of currents (transient current and peak current) when the semiconductor device 1 transitions from the sleep mode to the active mode.

The semiconductor device 1 is configured by including a plurality of power supply regions 101 to 10n (n being a positive integer; the same applies hereinafter), a power supply control unit 20, a current control unit 30, a control unit 40, and switches SW1 to SWn.

Figure 3:
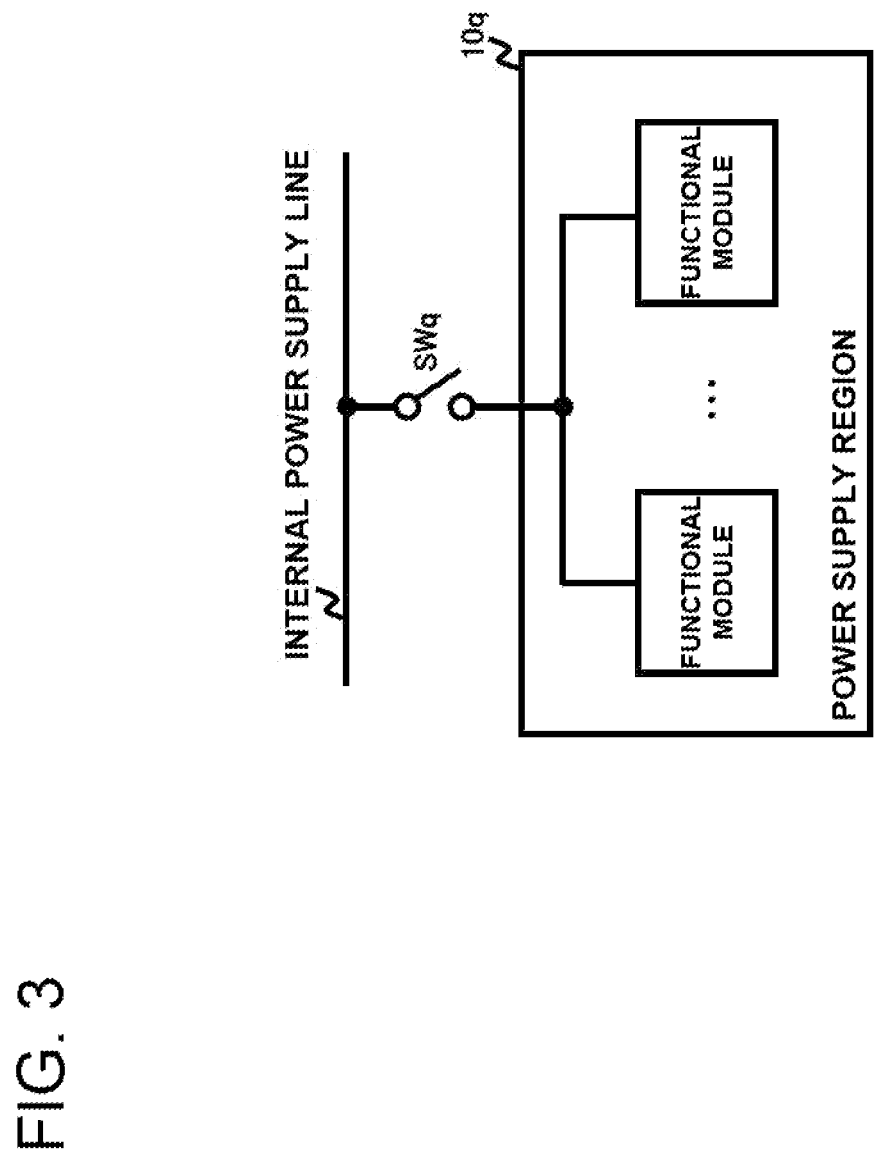
FIG. 3 is a diagram showing an example of an internal configuration of a power supply region.

Functional modules for implementing functions of the semiconductor device 1 are included in the power supply regions 101 to 10n. A memory module, an AD (Analog/Digital) converter, and the like, for example, correspond to the functional modules. A same one of the power supply regions is configured by including the functional module configured to operate by same power. FIG. 3 is a diagram showing an example of an internal configuration of the power supply region 10q (q being an integer not less than 1 and not more than n). As shown in FIG. 3, each power supply region may include a plurality of the functional modules. Naturally, one power supply region may be configured by including one functional module. The power supply regions 101 to 10n each serve as a load for the direct current power source 2 and the voltage converter 3.

The control unit 40 outputs a control signal to each of the power supply regions 101 to 10n and the power supply control unit 20. An internal power supply line is wired inside the semiconductor device 1 and is connected to the power supply regions 101 to 10n. The current control unit 30 is disposed between the internal power supply line and a capacitor connecting line extended from the external smoothing capacitor connection terminal T02. The current control unit 30 is connected to the direct power source 2 in parallel with the loads for the direct current power source 2, using the capacitor 4. The switches SW1 to SWn are connected between the internal power supply line and the respective power supply regions 101 to 10n.

The current control unit 30 is configured such that a conductance of the current control unit 30 is variable. The current control unit 30 is configured by including P-channel MOS transistors P1 and P2. By turning on the P-channel MOS transistor P1, a current flows from the internal power supply line to the capacitor connection line, thereby allowing charging of the capacitor 4. On the other hand, when flowing a current from the capacitor connection line to the internal power supply line to discharge the capacitor, the P-channel MOS transistors P1 and P2 are turned on. Herein, a driving capability of the P-channel MOS transistor P2 is designed to be higher than a driving capability of the P-channel MOS transistor P1 (the transistor having a higher driving capability is adopted). That is, the conductance of the current control unit 30 when charging the capacitor 4 (hereinafter defined as a first conductance) is proportional to the driving capability of the P-channel MOS transistor P1, while the conductance of the current control unit 30 when discharging the capacitor 4 (hereinafter defined as a second conductance) is proportional to the driving capabilities of the P-channel MOS transistors P1 and P2. Herein, determination of each of the first conductance and the second conductance depends on specifications of the direct current power source 2 and a capacitive load of each of the power supply regions 101 to 10n which serves as the load seen from the direct current power source 2. To take an example, the first conductance is reduced in order to reduce a peak of the current that is generated when charging the capacitor 4. Alternatively, when the capacitive load of the load is high and it is necessary to instantaneously supply much current from the capacitor 4, the second conductance is increased. That is, it is desirable that the second conductance be larger than the conductance of the direct current power source. Referring to FIG. 2, the power supply control unit 20 and the control unit 40 are described as different components. However, naturally, the control unit 40 may also perform an operation of the power supply control unit 20.

When the semiconductor device 1 is in the active mode, power is supplied to each of the power supply regions by short-circuiting a corresponding one of the switches SW1 to SWn. That is, when the power supply region (load seen from the direct current power source 2) is activated, the direct current power source 2 and the load are conducted. On the other hand, when the semiconductor device 1 is in the sleep mode, the power supply to each power supply region is stopped by opening a corresponding one of the switches SW1 to SWn. That is, when the power supply region is inactivated, the direct current power source 2 and the load are not in the conduction state. By stopping the power supply to each power supply region in the sleep mode, a leak current (standby current) within each power supply region is reduced. That is, power gating of the semiconductor device 1 can be implemented.

The power supply control unit 20 switches the conductance of the current control unit 30, and switches (short-circuited or opened) states of the switches SW1 to SWn, based on the control signal output by the control unit 40.

Next, a description will be given about operations of the semiconductor device 1 when the semiconductor device 1 transitions from the sleep mode to the active mode.

Figure 4:
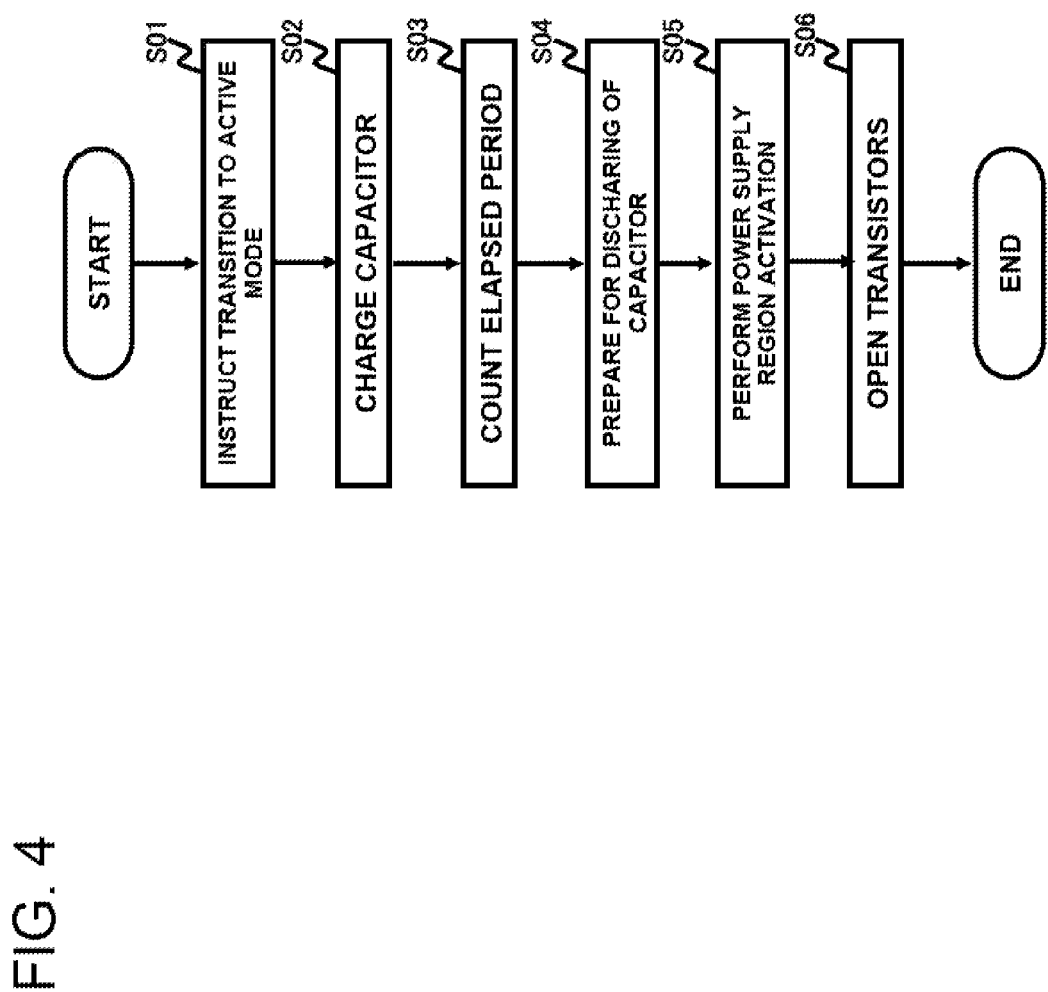
FIG. 4 is a flowchart showing an example of operations of the semiconductor device 1.

FIG. 4 is a flowchart showing an example of the operations of the semiconductor device 1.

In step S01, the control signal is output from the control unit 40 to the power supply control unit 20. The control signal in this case includes an instruction for activating at least one of the power supply regions 101 to 10n.

In step S02, the power supply control unit 20 that has received the control signal sets the current control unit 30 to the first conductance. By setting the current control unit 30 to the first conductance, a current flows from the internal power supply line to the capacitor 4. Charging of the capacitor 4 is thereby started.

In step S03, the power supply control unit 20 waits for a lapse of a predetermined period from setting of the first conductance. It is assumed that the predetermined period in this case can be set in the power supply control unit 20 by the control unit 40 as a period necessary for charging the capacitor 4. In that case, the predetermined period (charging period of the capacitor 4) can be set in the power supply control unit 20 by the control unit 40, according to the electrical characteristic of the load. More specifically, when the capacitive load of the at least one of the power supply regions to be activated is high, it is necessary to charge the capacitor with many electric charges (to increase the charging period). Then, the control unit 40 instructs charging for a long period to the power supply control unit 20. On the other hand, when the capacitive load of the at least one of the power supply regions to be activated is low, it is not necessary to charge the capacitor 4 with so many electric charges (the charging period may be short). In this case, the control unit 40 instructs charging for a short period to the power supply control unit 20. Alternatively, this predetermined period may be set to a predefined period irrespective of the electrical characteristic of the load.

In step S04, the power supply control unit 20 sets the conductance of the current control unit 30 to the second conductance. By setting the conductance of the current control unit 30 to the second conductance in this step, discharging efficiency of the capacitor 4 is enhanced.

In step S05, the power supply control unit 20 short-circuits the switch (one of the switches SW1 to SWn) connected to the at least one of the power supply regions to be activated. By short-circuiting the switch, power supply to the at least one of the power supply regions is started. The at least one of the power supply regions is thereby activated (activation is started).

In step S06, the power supply control unit 20 turns off the P-channel MOS transistors P1 and P2 included in the current control unit 30 at a timing at which a current to be supplied to the at least one of the power supply regions has been stabilized (timing at which the power supply region has become a steady state).

Next, a description will be given about a relationship among a voltage of the capacitor 4 (hereinafter indicated by Vc), an input/output current of the capacitor 4 (hereinafter indicated by Ic), and an output current of the voltage converter 3 (hereinafter indicated by Iout) when the semiconductor device 1 transitions from the sleep mode to the active mode.

Figure 5:
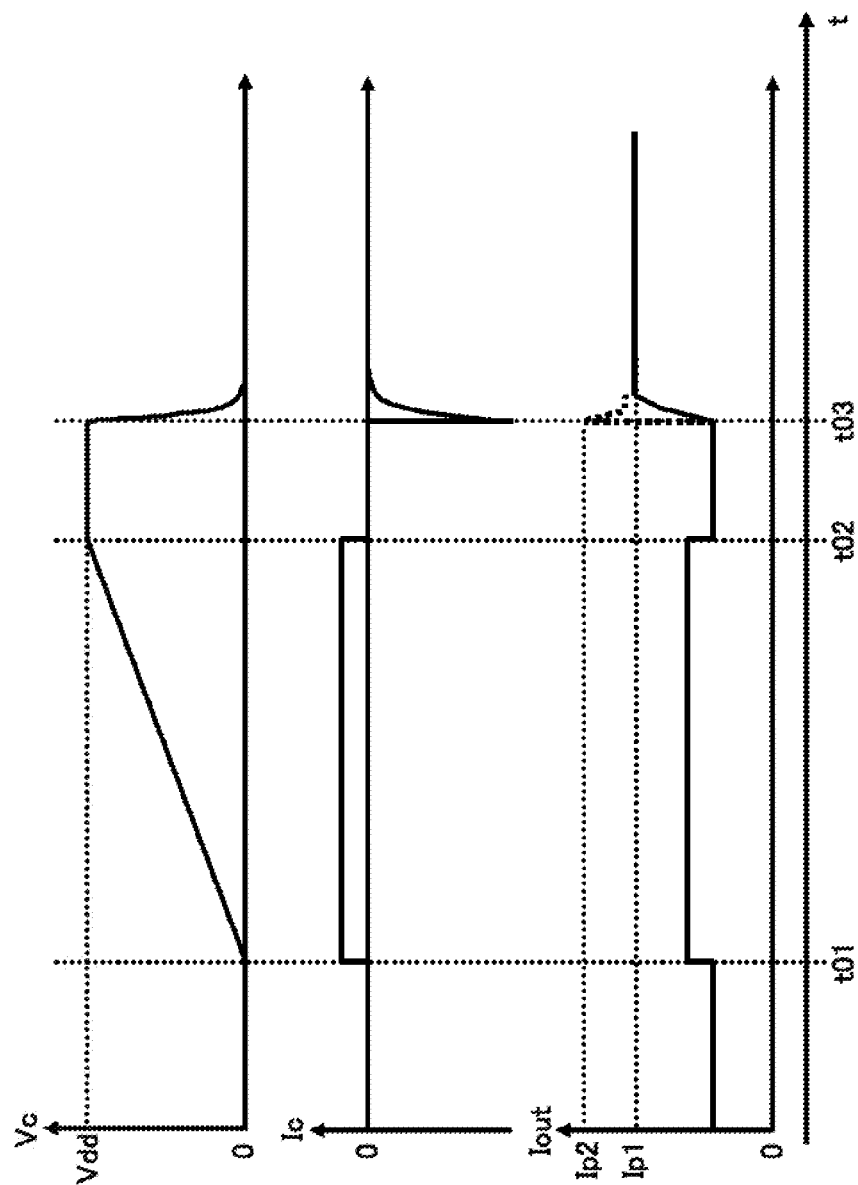
FIG. 5 includes graphs showing an example of a voltage and currents when the semiconductor device 1 returns to an active mode.

FIG. 5 includes graphs showing examples of the voltage and the currents when the semiconductor device 1 returns to the active mode.

It is assumed that in an initial state (before a time t01), the P-channel MOS transistors P1 and P2 are turned off and the capacitor 4 is fully discharged by an internal leak. That is, in the initial state, the voltage Vc is 0V. The output current Iout of the voltage converter 3 supplies a current of a given level to at least operate the power control unit 20.

First, at the timing of the time t01, the power supply control unit 20 sets the current control unit 30 to the first conductance, based on an instruction of the control unit 40 (turns on the P-channel MOS transistor P1). When the P-channel MOS transistor P1 is turned on, charging of the capacitor 4 is started. In this case, the current control unit 30 is set to the first conductance. The first conductance is set so that a current to be flown into the capacitor 4 at the time of charging assumes a value sufficiently lower than a maximum current value specified for the direct current power source 2. That is, significance of reducing a peak current when activating the at least one of the power supply regions is lost if the current to be generated by turning on the P-channel MOS transistor P1 exceeds the maximum current value specified for the direct current power source 2.

The power supply control unit 20 sets the current control unit 30 to the second conductance after charging of the capacitor 4 has been completed (at a time t02). When the charging is completed, the voltage Vc of the capacitor 4 equals to a power supply voltage Vdd of the semiconductor device 1. At a time t03, the power supply control unit 20 short-circuits the switch associated with the at least one of the power supply regions to be activated.

At this point, an internal voltage of the at least one of the power supply regions is raised from a ground potential to the power supply voltage Vdd. As a result, the current value of a transient current increases. However, the transient current in the semiconductor device 1 according to this exemplary embodiment is supplied from both of the direct current power source 2 and the capacitor 4, and most of the transient current is supplied from the capacitor 4. It is because the second conductance of the current control unit 30 is set to be sufficiently larger than the conductance of each of the direct power source and the voltage converter 3. That is, a transistor having a sufficiently high driving capability (e.g., with a high ratio of a channel width to a channel length) is adopted as the P-channel MOS transistor P2. By supplying the most of the transient current in the semiconductor device 1 from the capacitor 4, the peak current in the direct current power source 2 can be reduced (the output current maximum value can be reduced).

Referring to FIG. 5, the maximum value of the transient current in the semiconductor device 1 is indicated by Ip1. On the other hand, the maximum value of a transient current when current supply is not provided from the capacitor 4 is indicated by Ip2. Comparison between the maximum values IP1 and IP2 of the transient currents shows that the maximum value of the output current Iout of the direct current power source 2 is reduced.

The description was given about charging of the capacitor 4 to be performed in the semiconductor device 1 according to this exemplary embodiment when the at least one of the power supply regions was activated. The charging of the capacitor 4, however, can also be performed before activation of the at least one of the power supply regions. In that case, the P-channel MOS transistor P1 is not turned off in step S06 in FIG. 4 and conduction of the P-channel MOS transistor P1 is maintained. By charging the capacitor 4 in advance, activation of each power supply region can be sped up.

The description was given about the configuration in which the capacitor 4 was connected to the outside of the semiconductor device 1 in the semiconductor device 1 according to this exemplary embodiment. The present disclosure is not, however, limited to such connection. The capacitor 4 may be included inside the semiconductor device 1.

Further, the description was given about a case where the plurality of power supply regions were included. However, naturally, the number of the power supply regions to be included in the semiconductor device 1 may be one. Further, the description was given about a case where one of the plurality of power supply regions 101 to 10n was activated, by using the flowchart in FIG. 4. However, the present disclosure is not limited to activation of one power supply region, and a plurality of the power supply regions can also be activated. In this case, the control unit 40 can instruct the power supply control unit 20 to change the charging period of the capacitor 4 according to the number of the power supply regions to be activated. More specifically, a relationship between the number of the power supply regions to be activated and the charging period necessary for the activation is determined in advance. Then, the control unit 40 notifies the charging period to the power supply unit 20. Alternatively, it can be so arranged that the charging period is notified to the power supply control unit 20 from the control unit 40 by referring to a lookup table in which a combination of the power supply regions to be activated and the charging period associated with that combination are specified.

Further, the description was given about the configuration in FIG. 2 including one capacitor 4 and the current control unit 30 associated with the capacitor 4. However, a plurality of the capacitors may be connected to the semiconductor device 1.

Figure 6:
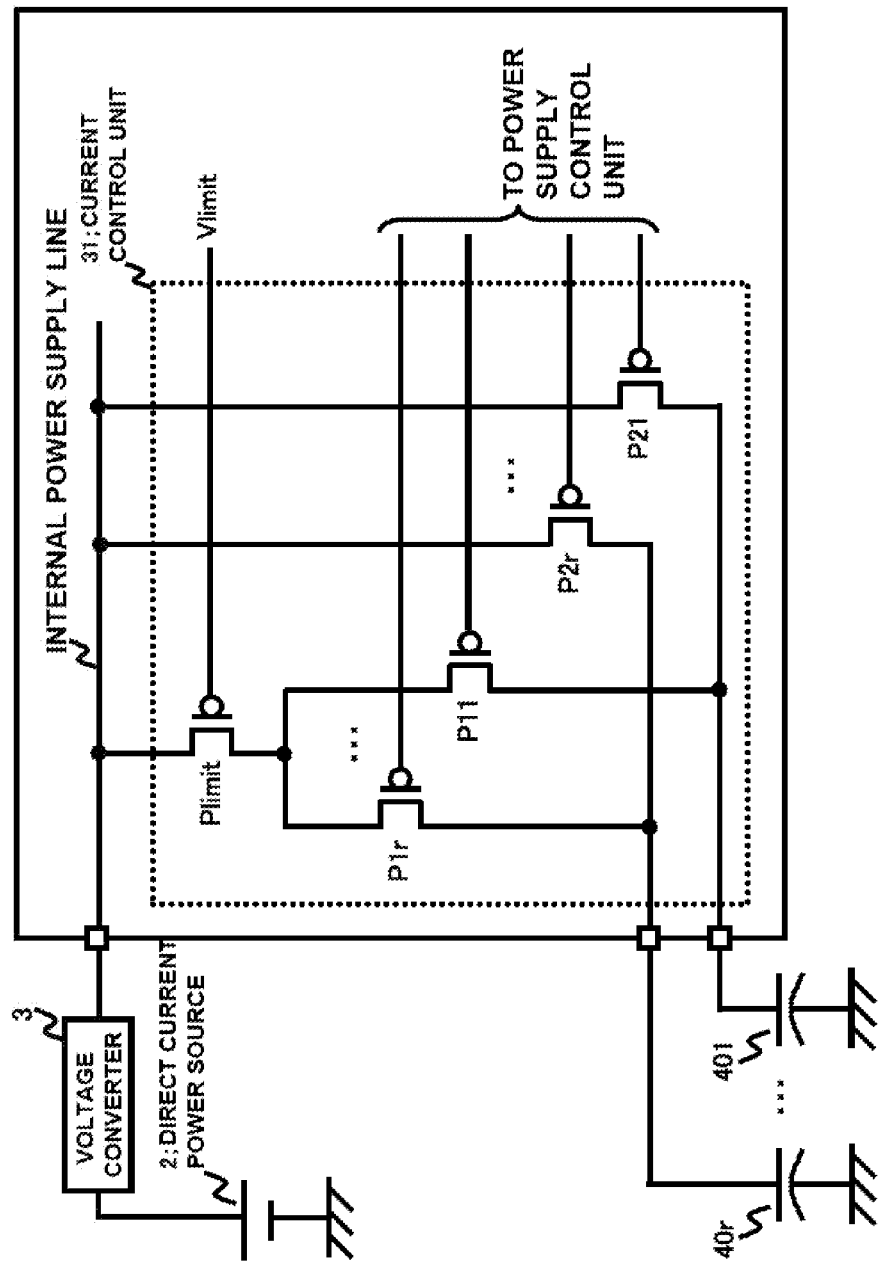
FIG. 6 is a diagram showing an example of an internal configuration of a current control unit 31 associated with a plurality of capacitors.

FIG. 6 is a diagram showing an example of an internal configuration of a current control unit 31. Referring to FIG. 6, a plurality of capacitors 401 to 40r (r being a positive integer; the same applies hereinafter) is connected to the semiconductor device. The current control unit 31 includes P-channel MOS transistors P11 to P1r and P-channel MOS transistors P21 to P2r associated with this plurality of capacitors 401 to 40r. The P-channel MOS transistors P11 to P1r each implement the first conductance. The P-channel MOS transistors P21 to P2r each implement the second conductance. That is, the current control unit is provided, being associated with each of the capacitors connected to the semiconductor device. Further, the current control unit 31 includes a P-channel MOS transistor Plimit connected in common to each source of the P-channel MOS transistors P11 to P1r. A gate of the P-channel MOS transistor Plimit receives a charging current limit signal Vlimit. The charging current limit signal Vlimit is output by the power supply control unit (not shown in FIG. 6).

When the plurality of capacitors 401 to 40r are to be simultaneously charged, a peak current to be supplied from the direct current power source 2 may increase. A driving capability of the P-channel MOS transistor Plimit is then appropriately selected. Then, when the plurality of capacitors 401 to 40r are charged, the P-channel MOS transistor Plimit is turned on. An upper limit is thereby provided to the sum of currents that will flow when charging is performed. As a result, even if the plurality of capacitors have been simultaneously charged, an excessive peak current flow can be prevented.

When the plurality of capacitors 401 to 40r are connected to the semiconductor device 1, the capacitors to be charged or discharged may be selected according the electrical characteristic of each of the power supply regions 101 to 10n (electrical characteristic of the load), the number of the power supply regions to be activated, and the like. When the circuit with a high load is activated, for example, an approach to perform charging or discharging using a lot of the capacitors can be taken. More specifically, the number of the capacitors to be charged can be determined according to the capacitive load of the load. When the number of the capacitors to be charged is determined, the value of capacitance formed of the plurality of capacitors is determined. Assume that the capacitance value of the capacitors is determined. Then, the value of a current that can be supplied from the direct current power source 2 (sum of charging currents) at a time of charging can be grasped using the driving capability of the P-channel MOS transistor Plimit. Thus, a period needed for the charging can be determined.

Further, it can be so arranged that in the sleep mode, the capacitor 4 is charged in advance, and a mode (halt mode) in which power consumption is further lower than that in this sleep mode can also be set. In such a mode using the lower power consumption, the capacitor 4 is not charged in advance, thereby allowing more reduction of a leak current of the capacitor 4.

Patent Literatures 1 and 2 each disclose a technology for reducing power consumption using the order of activating each module rather than a technology for reducing a peak current itself when each module is activated. When an output current peak is excessively limited, a voltage to be supplied to each module from a direct current power source falls short (which is a so-called brownout state), so that activation of each module may also be delayed. Further, in the technology disclosed in Patent Literature 3, a current value is not taken into consideration when the capacitor is charged or discharged. Thus, when the capacitor is charged, a peak current that will adversely affect the direct current power source may flow. On the other hand, when the capacitor is discharged, a current that is sufficient to reduce the peak current of the direct current power source may not be able to be supplied instantaneously. Accordingly, even with the technologies disclosed in Patent Literatures 1 to 3, a semiconductor device cannot be obtained in which the peak current of a current to be supplied from the direct current power source is reduced while reducing power consumption.

On the other hand, the capacitor 4 can be connected to the semiconductor device 1 according to this exemplary embodiment. Charging and discharging of the capacitor 4 are controlled by using the current control unit 30. When each power supply region is activated, the power supply control unit 20 included in the semiconductor device 1 turns on the P-channel MOS transistor P1, thereby charging the capacitor 4 while reducing a current that will flow into the capacitor 4. Further, the power supply control unit 20 turns on the P-channel MOS transistor P2, thereby producing a state suited for discharging of the capacitor 4. Then, the power supply region is activated. As a result, most of a current necessary for activating the power supply region can be supplied from the capacitor 4. Thus, deterioration of the direct current power source 2 can be suppressed.

EXAMPLE

Next, a semiconductor device suitable for use for a sensor node will be described.

Figure 7:
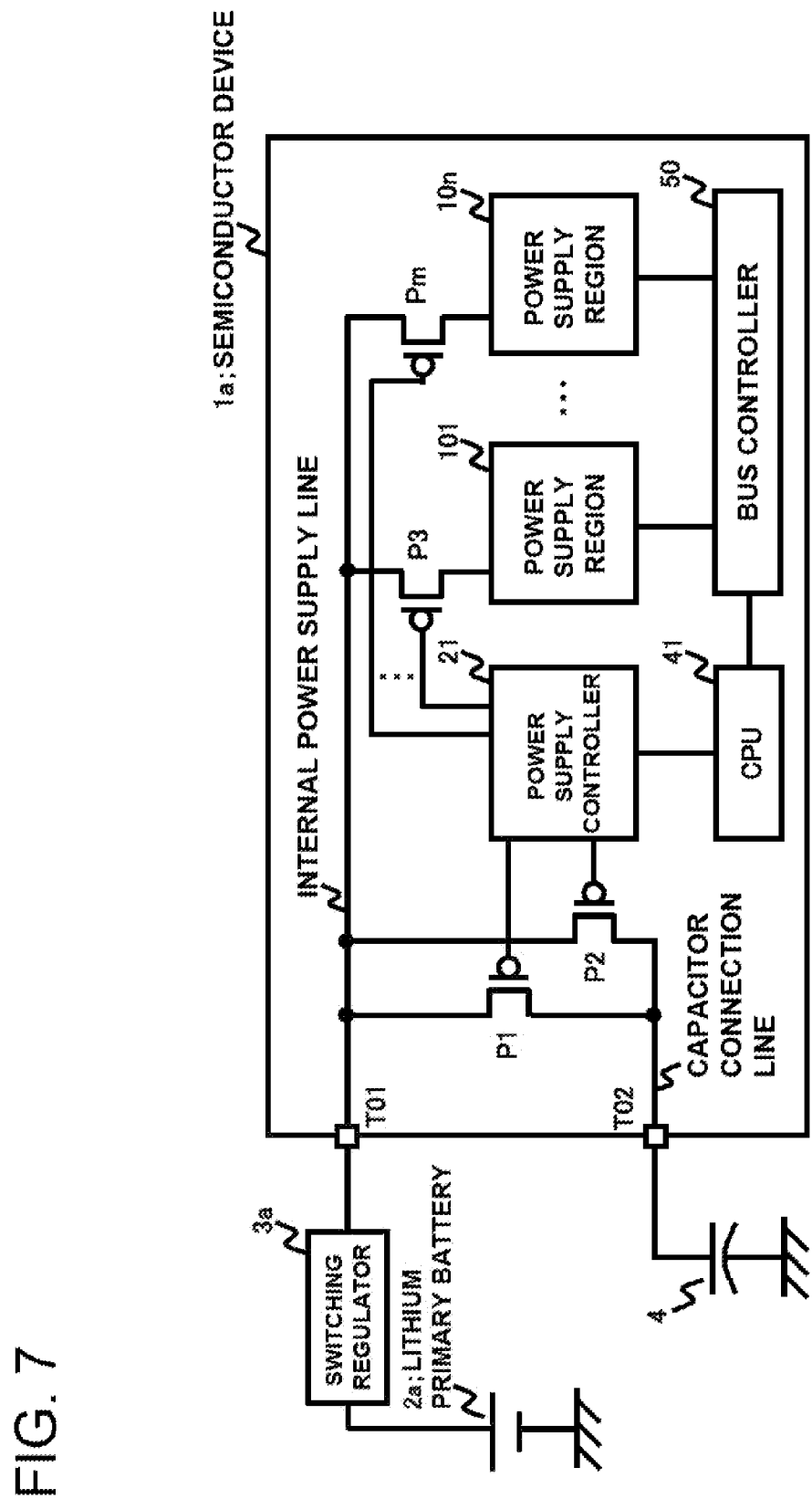

FIG. 7 is a diagram showing an example of an internal configuration of a semiconductor device 1a. Same reference signs are assigned to components that are the same as those in FIG. 2, thereby omitting description of the components that are the same as those in FIG. 2.

Referring to FIG. 7, a lithium primary battery 2a corresponds to the direct current source 2, a switching regulator 3a corresponds to the voltage converter 3, a power supply controller 21 corresponds to the power supply control unit 20, a CPU 41 corresponds to the control unit 40, and the switches SW1 to SWn respectively correspond to P-channel MOS transistors P3 to Pm (m being an integer of three or more; the same applies hereinafter).

The sensor node is required to be compact as well as to consume low power. For that reason, a lithium primary battery that is a compact battery with low self-discharge is often used as a direct current power source.

Preferably, the switching regulator 3a with good conversion efficiency is used as the voltage converter 3. A power supply voltage Vdd of the semiconductor device 1a is 1.2V or less. Conversion from a battery voltage of the lithium primary battery 2a to the power supply voltage Vdd is performed by the switching regulator 3a. Accordingly, it is preferable that the switching regulator 3a be connected in series between the input power supply terminal T01 of the semiconductor device 1a and the lithium primary battery 2a.

Preferably, the semiconductor device 1a used for the sensor node includes an SRAM (Static RAM) memory, a NAND-type flash memory, an AD converter, a timer module, a communication module, and so forth as functional modules, in addition to the CPU 41 and the power supply controller 21. In addition, a bus controller 50 configured to transfer data and an instruction between the CPU 41 and each functional module is included in the semiconductor device 1a. Each of these functional modules is disposed in one of the power supply regions 101 to 10n, according to the characteristic of the functional module.

It can be assumed that when using the sensor node, the maximum value of a peak current to be supplied is on the order of 100 mA when the power supply voltage is 1V. Further, when a maximum discharge continuation period is set to 1 μs, a necessary electric charge amount can be computed to be $1E^{-7}$ C. Preferably, the capacitance value of the capacitor 4 is 10 μF or more when voltage reduction up to 10% after discharging of the capacitor is permitted. Further, it is preferable that this capacitor 4 be a multi-layer ceramic capacitor having a low equivalent series resistance (ESR). Alternatively, pairs of the switches and the capacitors may be divided into a plurality of groups, and then the number of the capacitors for use may be determined according to the maximum current that is needed. A configuration may also be employed in which a plurality of the capacitors are connected in parallel so as to reduce the ESR. Alternatively, capacitors of different types may be connected in parallel to reduce the equivalent series resistance. Herein, it is preferable that a current driving capability of the capacitor 4 be set to at least 100 mA.

A field-effect transistor (FET) or a bipolar transistor can be used for each of the switches SW1 to SWn. When the field-effect transistor is used, it is preferable that a P-channel MOS transistor be used so as to efficiently flow a current in the vicinity of the power supply voltage Vdd. In that case, a source of the P-channel MOS transistor is connected to an internal power supply line, and a drain of the P-channel MOS transistor is connected to each power supply region. Further, a signal to be output from the power supply controller 21 is received at a gate of the P-channel MOS transistor, and the source and the drain of the P-channel MOS transistor are opened or short-circuited. The above description does not mean that the field-effect transistors to be used for the switches SW1 to SWn are not limited to the P-channel MOS transistors. N-channel MOS transistors can also be used for the switches SW1 to SWn. By applying a high voltage to a gate of each of high breakdown voltage N-channel MOS transistors, the N-channel MOS transistors can also be used for the switches SW1 to SWn. In that case, a voltage to be supplied to the power supply controller 21 is set to be higher than a voltage of the internal power supply line (source voltage of each N-channel MOS transistor). The two different voltages may be supplied from an outside of the semiconductor device 1a. Alternatively, the low voltage may be generated from the high voltage. When bipolar transistors are used, it is preferable that a configuration using pnp transistors be employed. A configuration using npn transistors may also be employed.

It may also be so configured that when the semiconductor device a includes a timer (not shown), an interrupt signal can be generated by the timer, and this interrupt signal is received by the power supply controller 21 to activate the CPU 41.

By using the semiconductor device 1a to be disclosed in this example for the sensor node, power consumption of the sensor node can be reduced, and a peak current can be reduced. As a result, the service life of the direct current source (primary battery or a secondary battery) can be prolonged, and an operation period of the sensor node can be extended. That is, maintenance cost for the sensor node can be reduced. Preferably, the semiconductor device 1a to be used for the sensor node has one of the above-mentioned configurations. However, the semiconductor device 1a is not of course limited to these configurations.

First Variation Example

Next, a variation example of the semiconductor device 1 according to the first exemplary embodiment will be described.

Figure 8:
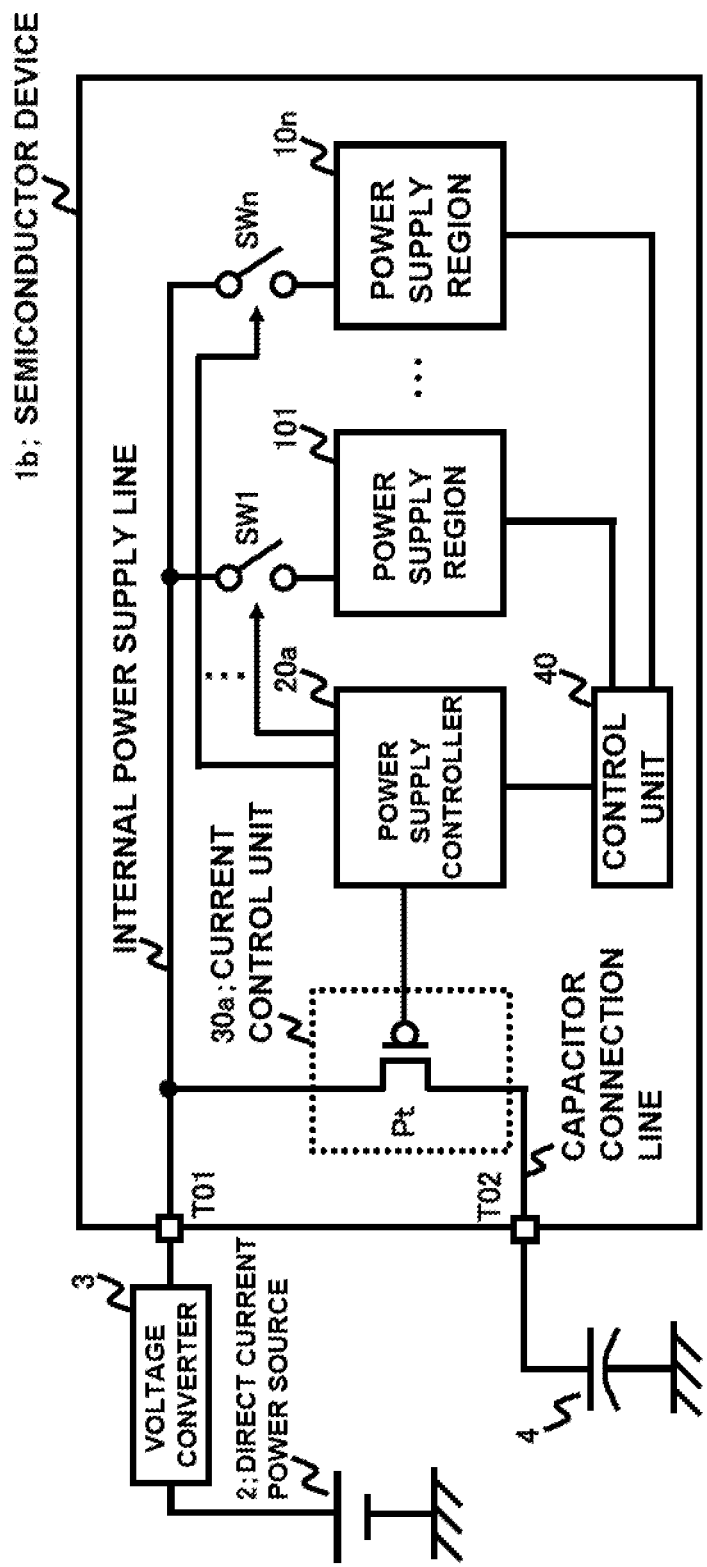
FIG. 8 is a diagram showing an example of an internal configuration of a semiconductor device 1b.

FIG. 8 is a diagram showing an example of an internal configuration of a semiconductor device 1b. Referring to FIG. 8, same reference signs are assigned to components that are the same as those in FIG. 2, thereby omitting description of the components that are the same as those in FIG. 2. The semiconductor device 1b is different from the semiconductor device 1 in a configuration of a current control unit 30a. The current control unit 30a is formed of a P-channel MOS transistor Pt. A power supply control unit 20a varies a gate voltage to be applied to a gate of the P-channel MOS transistor Pt, thereby setting the current control unit 30a to a first conductance or a second conductance. More specifically, when the capacitor 4 is charged, the gate voltage is set to be low. On the other hand, when the capacitor 4 is discharged, the gate voltage is set to be high. A bipolar transistor can also be used. In that case, by switching a voltage to be applied to a base of the bipolar transistor, a conductance is changed.

Also by using the current control unit 30a shown in FIG. 8, a peak current of the direct current power source 2 can be reduced, so that deterioration of the direct current power source 2 can be suppressed.

Second Variation Example

Next, a second variation example will be described.

Figure 9:
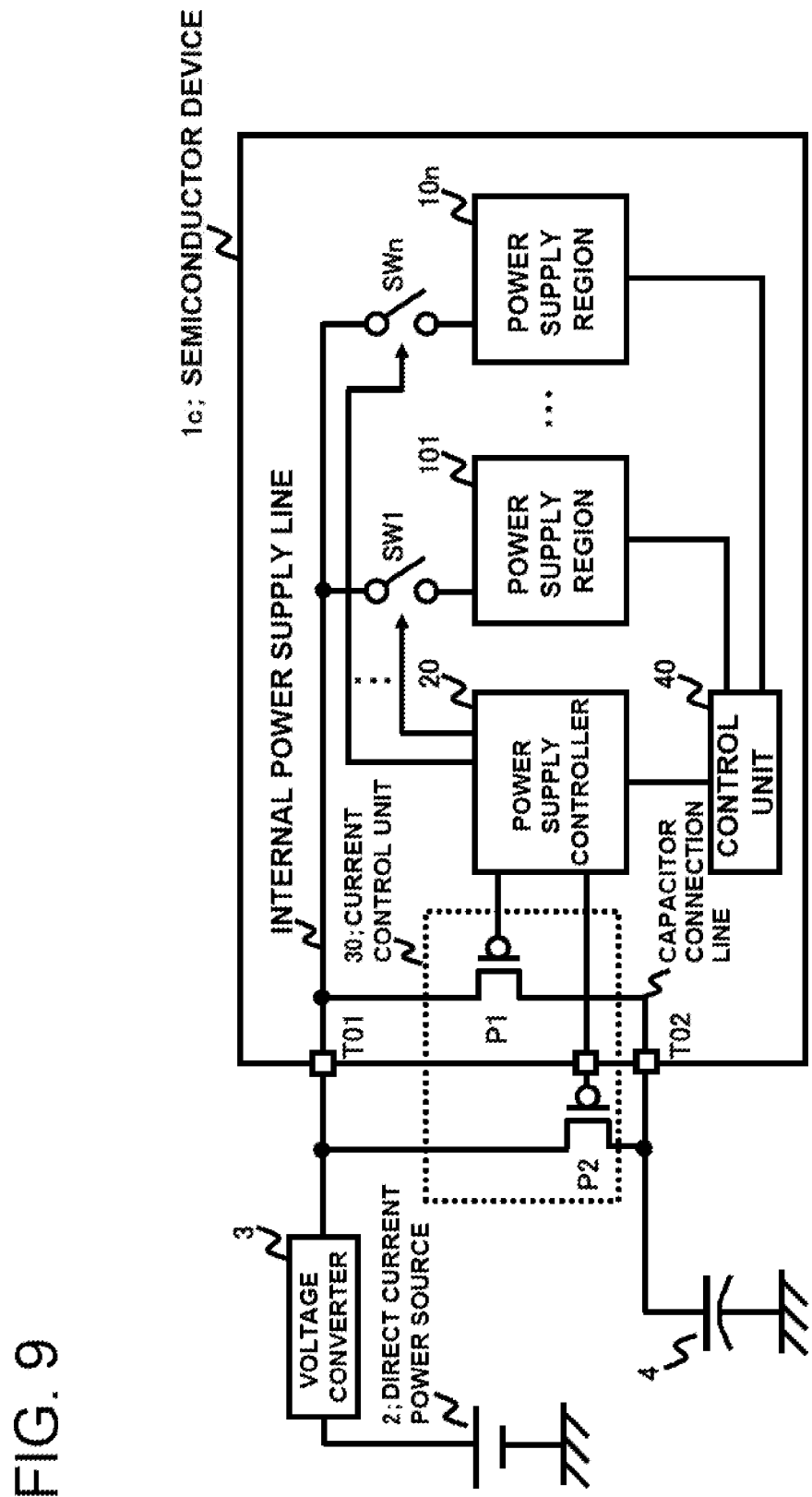
FIG. 9 is a diagram showing an example of an internal configuration of a semiconductor device 1c.

FIG. 9 is a diagram showing an example of an internal configuration of a semiconductor device 1c. Referring to FIG. 9, same reference signs are assigned to components that are the same as those in FIG. 2, thereby omitting description of the components that are the same as those in FIG. 2. The semiconductor device 1c is different from the semiconductor device 1 in provision of the P-channel MOS transistor P2 outside the semiconductor device 1c. In order to achieve that purpose, a control terminal of the P-channel MOS transistor P2 provided outside the semiconductor device 1c is newly provided for the semiconductor device 1c.

The power supply control unit 20 included in the semiconductor device 1c controls the P-channel MOS transistor P2 through this control terminal.

As described above, it is necessary that a conductance of the current control unit 30 be large in order to enhance discharging efficiency of the capacitor 4. That is, a driving capability of the P-channel MOS transistor P2 needs to be high, so that the size of the P-channel MOS transistor P2 is large. For that reason, it is preferable that such a large transistor be disposed outside the semiconductor device 1c (and is not formed on a same semiconductor substrate on which the power supply control unit 20 and the control unit 40 are disposed). This arrangement is made because, when such a transistor is to be disposed inside the semiconductor device 1c, an increase in the chip size and an increase the cost of the semiconductor device 1 are caused. Further, by using the P-channel MOS transistor P2 disposed outside the semiconductor 1c, influence to be caused by heat generation can be eliminated. This variation example is suitable particularly when a transient current necessary for activating each power supply region is large.

On the other hand, with regard to the P-channel MOS transistor P1, it is preferable that the P-channel MOS transistor P1 be disposed inside the semiconductor device 1c (the P-channel MOS transistor P1 is disposed on the same semiconductor substrate on which the power supply control unit 20 and the control unit 40 are disposed). The P-channel MOS transistor P1 is disposed inside the semiconductor device 1c because, though a first conductance is determined by a driving capability of the P-channel MOS transistor P1, it is not desirable for a user of the semiconductor device 1c to change this first conductance. When the first conductance is too small, a long period becomes necessary for charging the capacitor 4. When the first conductance is too large, a large current that does not comply with specifications required for the direct current power source 2 may flow. Accordingly, it is preferable that the development manufacturer of the semiconductor device 1c determines an optimal value for the first conductance and do not permit the change of the first conductance by the user. Further, the driving capability of the P-channel MOS transistor P1 does not need to be so high, and the size of the P-channel MOS transistor P1 is also small. Thus, even if the P-channel MOS transistor P1 has been disposed inside the semiconductor device 1c, an increase in the chip size and an increase in the cost of the semiconductor device 1c are not caused.

Third Variation Example

Next, a third variation example will be explained.

Figure 10:
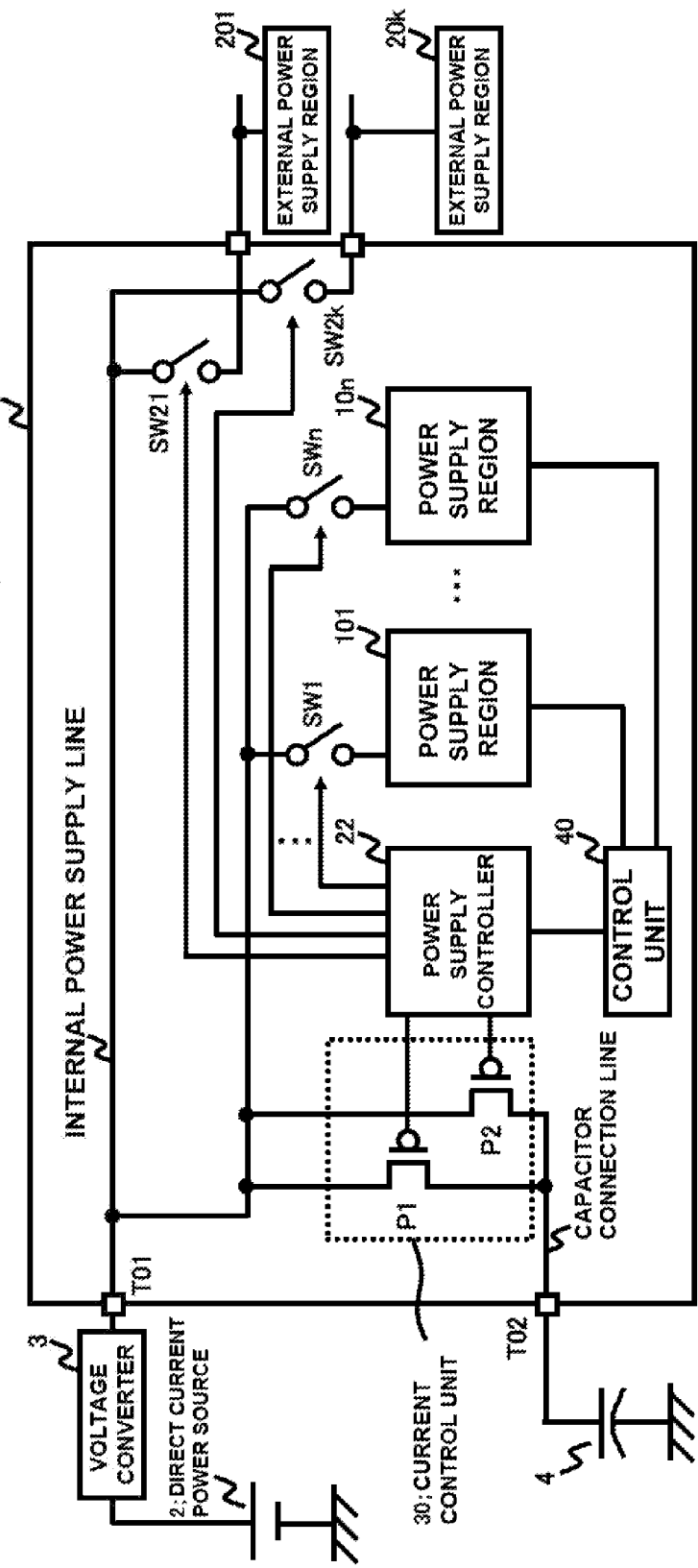
FIG. 10 is a diagram showing an example of an internal configuration of a semiconductor device 1d.

FIG. 10 is a diagram showing an example of an internal configuration of a semiconductor device 1d. Referring to FIG. 10, same reference signs are assigned to components that are the same as those in FIG. 2, thereby omitting description of the components that are the same as those in FIG. 2.

The semiconductor device 1d includes a configuration capable of supplying power to an external power supply region as well. The semiconductor device 1d includes at least one external voltage supply terminal for supplying power to a corresponding one of external power supply regions 201 to 20k (k being a positive integer; the same applies hereinafter).

A sensor module including a sensor configured to obtain environmental information and a sensor module configured to achieve wireless communication are to be disposed in the external power supply regions. Naturally, components to be disposed in the external power supply regions are not limited to these sensor modules.

Referring to FIG. 10, one external power supply region is connected to one external voltage supply terminal. A plurality of the external power supply regions may be, however, connected to one external voltage supply terminal (the plurality of the external power supply regions may share the one external voltage supply terminal).

The semiconductor device 1d further includes switches SW21 to SW2k associated with the respective external voltage supply terminals. Each of the switches SW21 to SW2k is disposed between an internal power supply line and a line extended from the external voltage supply terminal.

A power supply control unit 22 can control opening or short-circuiting of the switches SW21 to SW2k. When operations of the external power supply regions are not needed, the power supply control unit 22 opens these switches, thereby stopping power supply to each external power supply region and reducing a leak current to be generated in the external power supply region.

Electrical characteristics of the power supply regions 101 to 10n that are present inside the semiconductor device 1d are different from electrical characteristics of the external power supply regions 201 to 20k. That is, a capacitive load of each external power supply region is higher than that of each power supply region that is present inside the semiconductor device 1d. For that reason, it is necessary that a charging period of the capacitor 4 necessary for activating each of the external power supply regions 201 to 20k be set to be longer than a charging period of the capacitor 4 necessary for activating each of the power supply regions 101 to 10n inside the semiconductor device 1d. That is, the electrical characteristic of the load differs according to a case where the power supply region to be activated is present inside the semiconductor device 1d and a case where the power supply region to be activated is present outside the semiconductor device 1d. Thus, the control unit 40 needs to instruct the charging period suited to the electrical characteristic of the load.

The electrical characteristic of each of the power supply regions 101 to 10n that are present inside the semiconductor device 1d can be grasped in advance. Thus, it is possible to compute an optical charging period in advance based on a combination of the power supply regions to be activated or the like. With regard to each external power supply region, however, it is not known what circuit is to be connected to the semiconductor device 1d. Then, a user of the semiconductor device 1d can grasp the electrical characteristic of the power supply region to be connected to the semiconductor device 1d, and then can set the charging period of the capacitor 4, based on content of the electrical characteristic.

Alternatively, when the control unit 40 recognizes connection of the external power supply region, the control unit 40 itself may measure the electrical characteristic of the connected external power supply region. More specifically, the load of the external power supply region is varied by the control unit 40, and the control unit 40 measures the electrical characteristic (capacitive load) of the external power supply region based on a variation of a current supplied from the direct current power source on that occasion. The control unit 40 determines the charging period of the capacitor 4, based on the measured electrical characteristic. Since a control procedure when activating the external power supply region does not differ from the explanation using the flowchart in FIG. 4, further explanation will be omitted.

By controlling power supply to each external power supply region by a corresponding one of the switches SW21 to SW2k provided at the semiconductor device 1d, a peak current to be caused by activation of the external power supply region as well as a peak current of the semiconductor device 1d can be reduced. Accordingly, deterioration of the direct current power source can be suppressed.

Second Exemplary Embodiment

Next, a second exemplary embodiment will be described in detail with reference to the drawing.

Figure 11:
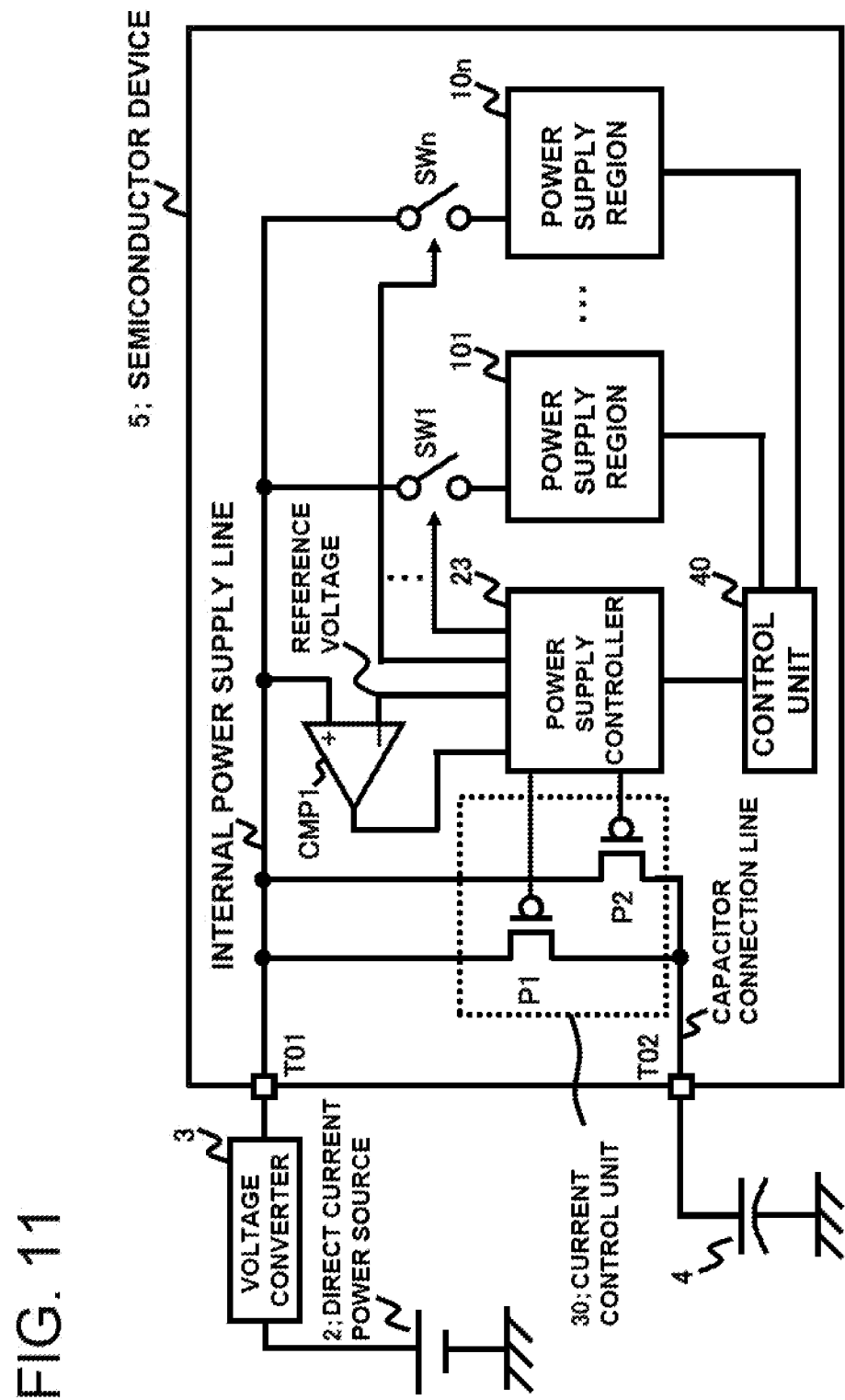
FIG. 11 is a diagram showing an example of an internal configuration of a semiconductor device 5 according to a second exemplary embodiment.

FIG. 11 is a diagram showing an example of an internal configuration of a semiconductor device 5 according to this exemplary embodiment. Referring to FIG. 11, same reference signs are assigned to components that are the same as those in FIG. 2, thereby omitting description of the components that are the same as those in FIG. 2. The semiconductor device 5 is different from the semiconductor device 1 in provision of a comparator CMP1.

The comparator CMP1 included in the semiconductor device 5 compares an internal voltage supplied from an internal power supply line and a reference voltage, and outputs a result of the comparison to a power supply control unit 23. It is assumed that the reference voltage is generated in an inside (including an inside of the power supply control unit 23) of the semiconductor device 5, and that the reference voltage is a voltage corresponding to a power supply voltage Vdd of the semiconductor device 5 or an operation guarantee minimum voltage (on the order of 0.9 times of the power supply voltage Vdd) of each module.

Even if the semiconductor device 5 is in an active mode, the power supply control unit 23 maintains conduction of the P-channel MOS transistor P1. Concurrently, the power supply control unit 23 monitors an output of the comparator CMP1. When the internal voltage falls below the reference voltage in that case, the power supply control unit 23 turns on the P-channel MOS transistor P2. By turning on of the P-channel MOS transistor P2, a current can be supplied from the capacitor 4 and the internal voltage can be matched to the reference voltage. The following arrangement can also be made. That is, when a voltage below the above-mentioned reference voltage is confirmed at a time of activating a module, the history is recorded in means such as the above-mentioned look-up table. Then, control can be so performed that at a subsequent time of activating the module, a current is supplied from the capacitor 4 in advance.

In this manner, the semiconductor device 5 can also reduce a transient current that will abruptly flow when each power supply region is operated as well as when the power supply region is activated.

Third Exemplary Embodiment

Next, a third exemplary embodiment will be described in detail with reference to the drawing.

Figure 12:
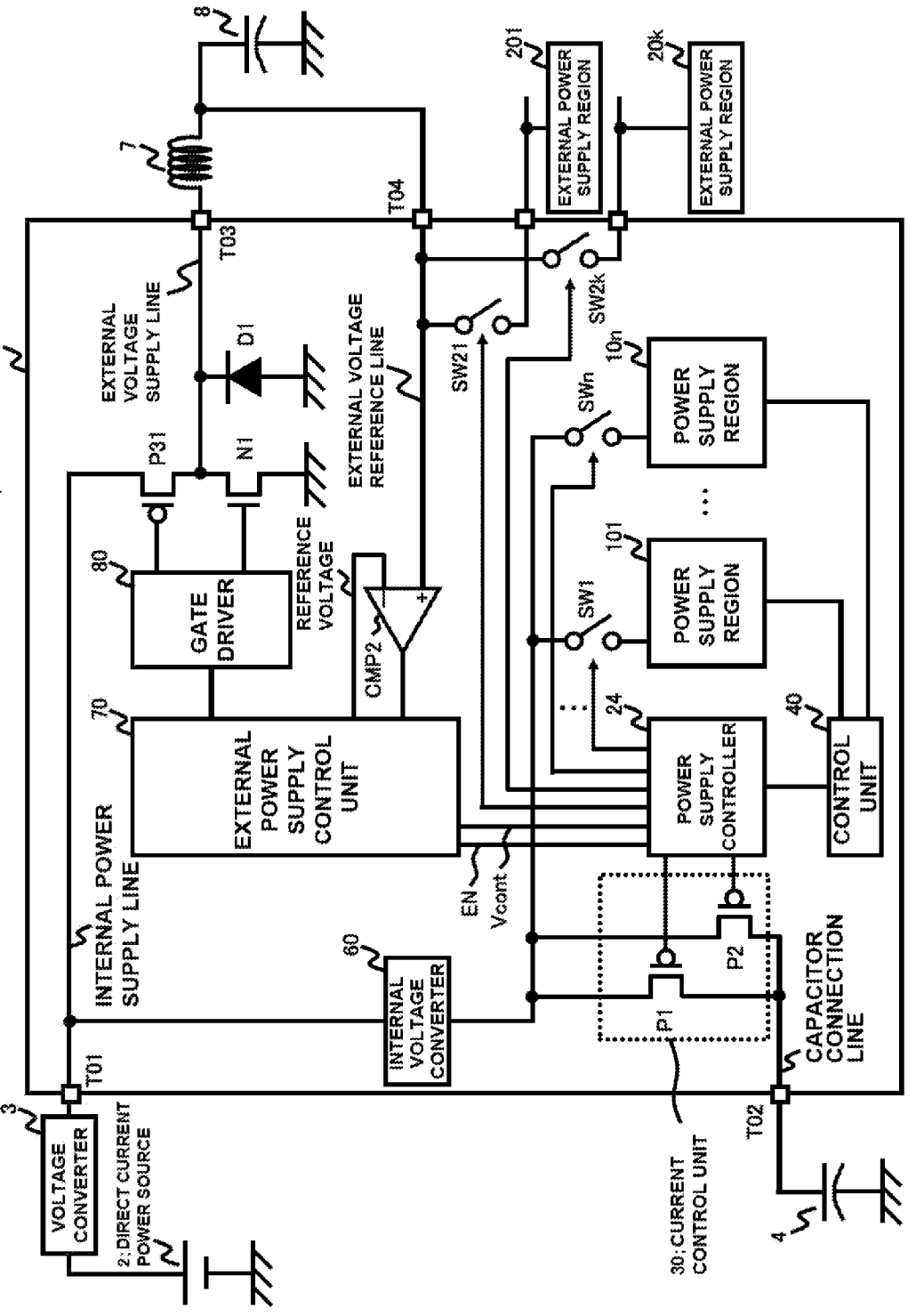
FIG. 12 is a diagram showing an example of an internal configuration of a semiconductor device 6 according to a third exemplary embodiment.

FIG. 12 is a diagram showing an example of an internal configuration of a semiconductor device 6. Referring to FIG. 12, same reference signs are assigned to components that are the same as those in FIGS. 10 and 11, thereby omitting description of the components that are the same as those in FIGS. 10 and 11.

The semiconductor device 6 converts a voltage supplied from the voltage converter 3 to a different voltage value, for supply to a power supply region inside the semiconductor device 6. Further, the semiconductor device 6 generates from the voltage supplied from the voltage converter 3 an external supply voltage to be supplied to an external power supply region, and supplies the generated voltage to the external power supply region. That is, the voltage to be supplied to the internal power supply region and the voltage to be supplied to the external power supply region are voltages that are different to each other.

The semiconductor device 6 is configured by further including an internal voltage converter 60, an external power supply control unit 70, a gate driver 80, a P-channel MOS transistor P31, an N-channel MOS transistor N1, a diode D1, and a comparator CMP2.

The internal voltage converter 60 converts the voltage supplied from an internal power supply line and then supplies the converted voltage to each of the power supply regions 101 to 10n.

Drains of the P-channel MOS transistor P31 (high-side switch) and the N-channel MOS transistor N1 (low-side switch) are connected in common to each other, and are connected to a rectangular wave output terminal T03. An external voltage supply line is connected to a set potential through the diode D1.

By complementarily turning on and off gates of the P-channel MOS transistor P31 and the N-channel MOS transistor N1, a rectangular wave is output from the rectangular wave output terminal T03. The rectangular wave output terminal T03 is connected to one end of a coil 7 disposed outside the semiconductor device 6. Further, the other end of the coil 7 and a capacitor 8 are connected, so that the coil 7 and capacitor 8 form a low-pass filter. The low-pass filter smoothes a voltage output from the rectangular wave output terminal T03.

An output of the low-pass filter (hereinafter referred to as an external voltage reference voltage) is connected to an external voltage reference terminal T04 of the semiconductor device 6. The comparator CMP2 and the external voltage reference terminal T04 are connected through an external voltage reference line. The external voltage reference voltage and a reference voltage generated by the external power supply control unit 70 are supplied to the comparator CMP2, and a result of comparison between both of the external voltage reference voltage and the reference voltage is output to the external power supply control unit 70. The external power supply control unit 70 receives an external power supply enabling signal EN and an external voltage instruction signal Vcont output by a power supply control unit 24.

The external power supply control unit 70 generates the reference voltage to be supplied to the comparator CMP2, based on the external voltage instruction signal Vcont. The external power supply control unit 70 corresponds to a unit configured to control the above-mentioned rectangular wave. The external power supply control unit 70 specifies a cycle of complementarily turning on and off the P-channel MOS transistor P31 and the N-channel MOS transistor N1 (determines a duty ratio) for the gate driver 80, based on the external voltage instruction signal Vcont. The gate driver 80 corresponds to a unit configured to generate the above-mentioned rectangular wave.

The external power supply control unit 70 generates a control signal for the gate driver 80 so that the external voltage reference voltage matches the reference voltage, based on the result of comparison output by the comparator CMP2. That is, the external power supply control unit 70 performs feedback control so that the external voltage reference voltage and the reference voltage match. The external voltage reference voltage thus generated is supplied to each the external power supply regions 201 to 20k through a corresponding one of the switches SW21 to SW2k. A control procedure when activating the external power supply region does not differ from the explanation using the flowchart in FIG. 4. Thus, further explanation will be omitted.

As described above, the semiconductor device 6 can supply to each external power supply region the voltage different from the power supply voltage to be used by the internal power supply region. Further, the power supply voltage to be supplied to the external power supply region can be specified by the control unit 40. Thus, a change in specifications of each external power supply region (such as a change in the power supply voltage) can be flexibly accommodated.

Each disclosure of the above-listed Patent Literatures is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element in each claim, each element in each exemplary embodiment and each example, each element in each drawing, and the like) are possible within the scope of the claims of the present invention. That is, the present invention naturally includes various variations and modifications that could be made by those skilled in the art according to the overall disclosure including the claims and the technical concept. With respect to a numerical value range described herein, an arbitrary numerical value and a small range included in the numerical value range should be construed to be specifically described even unless otherwise explicitly described.

REFERENCE SIGNS LIST 1, 1a, 1b, 1c, 1d, 5, 6, 300 semiconductor device
2 direct current power source
2a lithium primary battery
3 voltage converter
3a switching regulator
4, 8, 401~40r capacitor
7 coil
20, 20a, 22, 23, 24 power supply control unit
21 power supply controller
30, 30a, 31, 301 current control unit
40, 302 control unit
41 CPU
50 bus controller
60 internal voltage converter
70 external power supply controller
80 gate driver
101~10n, 10q power supply region
201~20k external power supply region
CMP1, CMP2 comparator
D1 diode
N1 N-channel MOS transistor
P1~Pm, P11~P1r, P21~P2r, P31,
Pt Plimit P-channel MOS transistor
SW1~SWn, SW21~SW2k, SWq switch

The invention claimed is:

1. A semiconductor device, comprising:
a current control unit whose conductance is variable; and
a control unit configured to control the conductance of the current control unit, wherein,
the current control unit is connected to a direct current power source in parallel with a load for the direct current power source, through a capacitor,
the control unit sets the current control unit to a first conductance when the direct current power source and the load are not in a conduction state,
the control unit sets the current control unit to a second conductance larger than the first conductance when the direct current power source and the load are in the conduction state, and
the control unit changes control over the current control unit according to an electrical characteristic of the load.

2. The semiconductor device according to claim 1, wherein
the second conductance is larger than a conductance of the direct current power source.

3. The semiconductor device according to claim 1, wherein
the current control unit is configured by including a first MOS transistor and a second MOS transistor having a diving capability higher than the first MOS transistor; and
the control unit sets the first conductance by turning on the first MOS transistor, and sets the second conductance by turning on the second MOS transistor.

4. The semiconductor device according to claim 3, wherein
the first MOS transistor and the control unit are formed on a same semiconductor substrate.

5. The semiconductor device according to claim 4, wherein
at least one of the capacitor and the second MOS transistor is formed outside the semiconductor substrate.

6. The semiconductor device according to claim 5, including:
at least one of a terminal configured to connect the capacitor and a terminal configured to control the second MOS transistor.

7. The semiconductor device according to claim 1, wherein
the current control unit is configured by including an MOS transistor or a bipolar transistor; and
the control unit switches the first conductance and the second conductance by varying a gate voltage of the MOS transistor or a base current of the bipolar transistor.

8. The semiconductor device according to claim 1, wherein
the load is constituted from a plurality of power supply regions, and a switch is provided for each of the plurality of power supply regions; and
the control unit turns on the switch when the direct current power source and the load are in the conduction state.

9. The semiconductor device according to claim 8, wherein
the control unit determines a time to charge the capacitor, based on a number of the power supply regions of the plurality of power supply regions to be activated.

10. The semiconductor device according to claim 1, wherein
the semiconductor device includes a voltage converter configured to convert a first voltage supplied from the direct current power source to a second voltage; and the load receives one of the first voltage and the second voltage.

11. The semiconductor device according to claim 10, wherein the semiconductor device includes:
a first comparator configured to output a result of comparison between the second voltage and a first reference voltage; and
when the first voltage becomes lower than the first reference voltage, the control unit sets the current control unit to the second conductance, based on a result of an output of the first comparator.

12. The semiconductor device according to claim 10, including:
a rectangular wave generation unit configured to generate from the first voltage a rectangular wave with a predetermined cycle and supplies to the load a third voltage obtained by smoothing the rectangular wave;
a second comparator configured to output a result of comparison between the third voltage and a second reference voltage; and
a rectangular wave control unit configured to change the cycle of the rectangular wave, based on a result of an output of the second comparator.

13. The semiconductor device according to claim 12, wherein
the rectangular wave generation unit is configured by including a high-side switch connected to a first power supply line configured to supply the first voltage and a low-side switch with one end thereof connected to a ground potential; and
the rectangular wave control unit complementarily switches the high-side switch and the low-side switch, thereby changing the cycle of the rectangular wave.

14. A sensor node comprising:
the semiconductor device according to claim 1;
a direct current power source;
a voltage converter configured to convert a voltage output by the direct current power source and supply the converted voltage to the semiconductor device; and
a sensor module including a sensor configured to detect an external environmental condition.

15. A semiconductor device, comprising:
a current control unit whose conductance is variable;
a control unit configured to control the conductance of the current control unit,
wherein the current control unit is connected to a direct current power source in parallel with a load for the direct current power source, through a capacitor,
the control unit sets the current control unit to a first conductance when the direct current power source and the load are not in a conduction state, and
the control unit sets the current control unit to a second conductance larger than the first conductance when the direct current power source and the load are in the conduction state; and
a plurality of the current control units respectively associated with a plurality of the capacitors disposed in parallel between the direct current power source and the load.

16. The semiconductor device according to claim 15, wherein
the control unit determines a number of capacitors to be charged out of the plurality of the capacitors, according to a capacitive load of the load.

17. The semiconductor device according to claim 15, wherein
the control unit determines a number of the capacitors to be charged, according to the electrical characteristic of the load.

18. A power supply control method of a semiconductor device comprising a current control unit connected to a direct current power source in parallel with a load for the direct current source, through a capacitor, a conductance of the current control unit being variable, the power supply control method comprising:
setting the current control unit to a first conductance, thereby starting charging of the capacitor;
setting the current control unit to a second conductance larger than the first conductance when the direct current source and the load are conducted, thereby starting discharging of the capacitor, wherein,
the semiconductor device includes:
a plurality of the capacitors, and
a plurality of the current control units respectively associated with the plurality of the capacitors, and
the power supply control method includes:
determining a number of the capacitors of the plurality of the capacitors to be charged according to the electrical characteristic of the load.

19. The power supply control method of the semiconductor device according to claim 18, further including:
changing a period for charging the capacitor according to an electrical characteristic of the load.

20. The power supply control method of the semiconductor device according to claim 18, including:
when the load includes a plurality of power supply regions, changing the period for charging the capacitor based on a number of the power supply regions to be activated.

* * * * *